UNITED STATES PATENT OFFICE.

ALFRED MONNIER, OF CAMDEN, NEW JERSEY.

IMPROVEMENT IN THE MANUFACTURE OF SULPHURIC ACID.

Specification forming part of Letters Patent No. 17,976, dated August 11, 1857.

*To all whom it may concern:*

Be it known that I, ALFRED MONNIER, of the city of Camden, and State of New Jersey, have invented a new and useful Improvement in the Manufacture of Sulphuric Acid from Iron Pyrites (Sulphuret of Iron) or other Native Metallic Sulphurets; and I do hereby declare the following to be a full and exact description of the same.

Heretofore sulphuric acid has been manufactured by burning sulphur with a free accession of atmospheric air, and thus forming sulphurous acid, ($SO^2$,) which is united with oxygen obtained by burning nitrate of potash or nitrate of soda.

Sometimes sulphuric acid has been manufactured from metallic sulphurets or pyrites by heating it in close retorts and distilling over the sulphur, and afterward burning the sulphur so obtained with oxygen derived as in the other process; but in this way only thirty per cent. of the sulphur contained in the pyrites could be extracted. Another mode of treating pyrites was to burn the pyrites in a furnace furnished with a free supply of oxygen by the draft of a chimney or by a blower. In this way only forty per cent. of the sulphur could be obtained in the form of sulphurous acid from the metallic sulphurets. A third mode of treating the pyrites or sulphuret was by decomposing the sulphuret with a current of heated steam, and thus obtaining sulphureted hydrogen, (SH.) This was then collected in a gasometer and burned, forming sulphurous acid and water, which sulphurous acid so obtained was oxidized, as above stated.

My improvement has for its object the manufacture of sulphuric acid from pyrites or any of the native metallic sulphurets, whether simple or compound sulphurets—such as sulphuret of iron, sulphuret of copper, sulphuret of nickel, sulphuret of zinc, &c.—and I treat the sulphuret as follows:

If the native sulphuret of iron is employed, then I pulverize the sulphuret of iron and mix it thoroughly with from thirty-three to seventy-five per cent. of its weight of either caustic soda, carbonate of soda, sulphuret of sodium, sulphate of soda, or with corresponding compounds of potash, or with sulphate of lime, sulphate of baryta, sulphate of strontia, or sulphate of iron. To this compound a sufficient quantity of water is added to keep it moist, and the mixture is retained in a state of moisture for eight or ten days, and is afterward molded into blocks of any convenient size or shape. When it is desired to use these blocks they are to be heated so as to expel the water. This expulsion of the water also leaves the mass in a porous state and facilitates its combustion.

If it is desired to employ the mixture at once, a smaller quantity of water may be employed, sufficient to make the mass coherent, and this mixture is immediately made into blocks. These blocks are burned in the same manner in which pure sulphur is ordinarily burned, or it will burn better in a muffle, air being supplied through a grate.

This compound burns very freely, and all, or nearly all, of the sulphur of the pyrites is converted into sulphurous acid, and is afterward caused to combine with oxygen, supplied in the ordinary manner of making sulphuric acid—viz., from nitrate of potash or nitrate of soda, or nitric acid. When caustic soda, sulphuret of sodium, or sulphate of soda, carbonate of soda, or either of the corresponding salts of potash is employed the residue, after the sulphur has been converted into sulphurous acid, will contain sulphate of soda, or a salt of potash and peroxide of iron ($SO_3Nao$) and ($Fe_2o_3$). The sulphate of soda or salt of potash can be dissolved in water, and evaporation can be obtained free from the oxide of iron, and this sulphate of soda can be again used for the decomposition of a fresh quantity of sulphuret of iron or pyrites. When sulphate of iron is used in the first instance with the pyrites the residue is peroxide of iron only, or if sulphate of lime, or of strontia, or of baryta, be employed the residue will be sulphate of lime, of strontia, or of baryta mixed with peroxide of iron.

If sulphuret of zinc, sulphuret of copper, or analogous sulphuret be employed, the above-mentioned process is the same, except that the sulphate of zinc or the sulphate of copper respectively should be substituted for the sulphate of iron. In this case—the roasting or calcination of sulphuret of copper or nickel—the calcination should not be pushed too far, so that a portion of sulphur may still remain in the mixture, and after extracting the sulphate of soda by lixiviation the residue may be fused into a valuable sulphuret, the oxide of iron, if present, uniting with a flux and being removed from the sulphuret.

Instead of using caustic soda, sulphuret of sodium, sulphate of soda, or sulphate of iron, or either of the salts of potash above named, in the solid state in the first stage of the process, these can be used in the state of a concentrated solution. The refuse or oxide of iron which remains after the process can be used as a paint.

Either of the salts above mentioned, and perhaps some salts not mentioned above, could be used in the preliminary treatment of the pyrites, but the sulphate of soda is the most advantageous and economical.

The advantage of my improved process above described is that all, or nearly all, the sulphur contained in the sulphuret of iron or other metallic sulphuret can be converted into sulphuric acid, thus effecting a great economy in the manufacture of that acid.

Instead of pulverizing the metallic sulphurets, as found native, and mixing them immediately with either of the substances above mentioned, in the first instance, the native sulphuret might be partially reduced by a simple roasting or fusion, and the residue treated by pulverizing and mixing it, as above described.

Having thus described my improved process, what I claim, and desire to secure by Letters Patent, is—

The process of preparing native metallic sulphurets by pulverizing them and mixing them with the substances as above described, in order to extract all, or nearly all, the sulphur from them, for the purpose of making sulphuric acid.

ALFRED MONNIER.

Witnesses:
J. A. H. B. JENKINS,
JNO. B. KENNEY.